(12) United States Patent
Tompkins

(10) Patent No.: US 6,400,900 B1
(45) Date of Patent: Jun. 4, 2002

(54) METHOD AND APPARATUS FOR PHOTOGRAPHING FLUORESCENT UNDERSEA LIFE FORMS IN DARKNESS

(76) Inventor: Devon R. Tompkins, 15 Villa Ave. #42, Clovis, CA (US) 93612

( * ) Notice: Subject to any disclaimer, the term of this patent is extended or adjusted under 35 U.S.C. 154(b) by 0 days.

(21) Appl. No.: 09/597,643

(22) Filed: Jun. 20, 2000

(51) Int. Cl.[7] .......................... G03B 17/08; G03B 15/03
(52) U.S. Cl. ........................................ 396/28; 396/155
(58) Field of Search ............................. 396/25, 28, 155

(56) References Cited

U.S. PATENT DOCUMENTS

| | | | | |
|---|---|---|---|---|
| 2,996,967 A | * | 8/1961 | Edgerton | 396/28 |
| 3,571,649 A | * | 3/1971 | Bush, Jr. | 396/28 |
| 3,738,248 A | * | 6/1973 | Fish et al. | 396/28 |
| 3,971,654 A | * | 7/1976 | Kleinberg et al. | 396/16 |
| 4,096,500 A | * | 6/1978 | Lermann et al. | 352/137 |
| 4,179,204 A | * | 12/1979 | Robinson | 396/155 |
| 4,660,949 A | * | 4/1987 | Saito et al. | 396/208 |
| 4,887,106 A | * | 12/1989 | Cooper, Jr. | 396/16 |
| 6,151,521 A | * | 11/2000 | Guo et al. | 396/325 |

OTHER PUBLICATIONS

Doubilet, David, a New Light in the sea, National Geographic, vol. 192 (2), p. 32–43, (Aug. 1997).*
Samuel M. Goldwasser, Sam's F–Lamp FAQ Fluorescent Lamps, Ballasts, and Fixtures, (C) 1994, 1995, 1996, 1997, 1999.*
Cross, E. R., Skin Diver, v45, n11,, p24(3) Nov. 1996.*

* cited by examiner

Primary Examiner—Christopher Mahoney
(74) Attorney, Agent, or Firm—Robert Nathans

(57) ABSTRACT

An underwater camera having high speed film is coupled to illumination apparatus that includes a pair of ultraviolet-white-light fluorescent light bulbs for illuminating fluorescent life forms at night, and having a substantial component of ultraviolet light of a wavelength of about 365 nanometers, along with light having significant components of wavelength extending substantially throughout the visible spectrum. A transparent optical grade tubular protective enclosure surrounds the light bulbs and their electrical components.

20 Claims, 1 Drawing Sheet

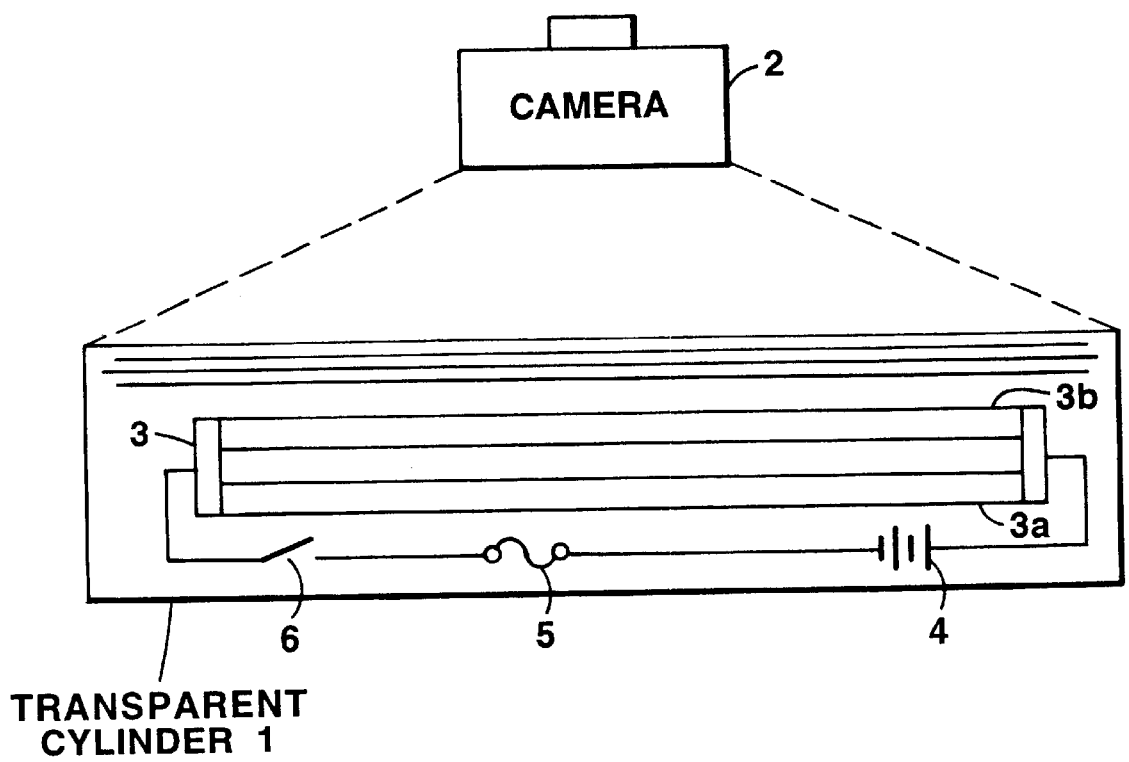

METHOD AND APPARATUS FOR PHOTOGRAPHING FLUORESCENT UNDERSEA LIFE FORMS IN DARKNESS

BACKGROUND OF THE INVENTION

The present invention relates to the field of underwater photography.

Many sub-aquatic life forms possess a capability of fluorescence, which is sometimes mistaken for bioluminescence, the light radiating of fireflies. Fluorescence, in contrast, is the emission of light from a body, during illumination by excitation light having a higher frequency than the light emitted by the fluorescing body. When the excitation light is extinguished, the light produced by fluorescence ceases.

As an underwater photographer, I tried to photograph fluorescent aquatic life forms at night because they are most active at night. I was unsuccessful in doing so. The fact that the photographs needed to be exposed in darkness with very limited ambient light, and that ultra-violet (uv) light is needed to excite the fluorescence of these undersea creatures, defeated my ability to capture decent images of the undersea creatures, even with high speed film.

I began to experiment with building my own underwater camera-illumination apparatus using black light sources such as blue-black ultra-violet bulbs, which still did not produce satisfactory photographs. When I utilized the commonplace ultra-violet-black lamp, there was not enough light emitted to produce any image except the ghost image of the fluorescent pigments of the observed animals. My goal was to photograph the animals and also excite or enhance their fluorescence.

BRIEF SUMMARY OF A PREFERRED EMBODIMENT OF THE INVENTION

My success finally came about by employing a pair of commercially available fluorescent light bulbs that are commercially designated as "U/V White" light tubes, and that are commonly used as insect killing lights, These bulbs have a substantial, probably a maximum, ultraviolet (uv) light spectrum output component at about 365 nanometers (nm), similar to the ordinary blacklight bulb, but they also output significant amounts of white light, which produce enough ambient light for my purpose, to enable the aforesaid desired satisfactory photographs of aquatic creatures at night.

BRIEF DESCRIPTION OF THE DRAWING

The various features and advantages of the invention will become more apparent upon reading of the following detailed description, taken in conjunction with the sole figure schematically illustrating the preferred embodiment of the invention.

DESCRIPTION OF A PREFERRED EMBODIMENT OF THE INVENTION

The illumination light apparatus is contained within a waterproof enclosure 1, mechanically coupled to underwater camera 2 via an adjustable coupling means indicated by the dashed lines, and includes a twin-tube fluorescent lighting fixture element 3 found in most hardware stores. The fixture element 3 includes a built in transformer-converter that accepts 12 volts from DC battery 4 and converts it to 110 volt alternating current. Fuse 5 and on/off switch 6 control the operation of the lighting fixture in the conventional manner. The two fluorescent tubes or bulbs 3a and 3b I used are eighteen inches in length and are designated as ultraviolet-white or "U/V White" fluorescent light tubes, commonly used as insect killing lights. These bulbs, manufactured by NEC corporation, have a substantial, ultraviolet (uv) light spectrum output component at about 365 nanometers (nm), similar to the common blacklight bulb, but they also output significant amounts of white light, which produce enough ambient light for my purpose, to enable the aforesaid desired satisfactory photographs of the aforesaid aquatic creatures at night. These bulbs enable the production or enhancement of the desired fluorescence, along with a good informative image of the observed life forms under observation. The aforesaid uv black lamp yielded no image except for blue-green outlines.

These items including illumination bulb fixture 3, were contained in apparatus built by me, within a transparent waterproof cylindrical optical grade acrylic tube enclosure 1, having a length of twenty-two inches and a five inch internal diameter. They are sealed at the ends with rubber O-rings.

The resulting apparatus is then used to photograph aquatic life forms in darkness when they are most active. The speed of the film I used to obtain good results was iso (asa) 800–1600 high speed film. I have been using both 35 mm and 120 mm format camera systems, Nikons and Rolleflex. The nature of the high speed film and camera are not believed to be of importance in obtaining good results.

As variations of the aforesaid method and apparatus will occur to the skilled worker in the art, the scope of the invention is to be limited solely by the terms of the following claims and art recognized equivalents thereof.

I claim:

1. A method of photographing underwater fife forms, capable of fluorescence, in a darkened underwater environment comprising the steps of:
   (a) providing a camera having illumination means associated therewith for exposing said underwater fife forms, capable of fluorescence, to illuminating having a spectrum with a substantial component of ultraviolet light having a wavelength of about 365 nanometers along with fight also having components of wavelength extending substantially throughout the visible spectrum; and
   (b) utilizing said camera to photograph said underwater life forms in said darkened underwater environment with high speed film.

2. The method of claim 1 wherein said camera employs film having a speed of ASA 800–1600.

3. The method of claim 2 wherein said illumination means comprises at least one ultra-violet-white fluorescent light bulb.

4. The method of claim 1 wherein said illumination means comprises at least one ultra-violet-white fluorescent light bulb.

5. Apparatus for photographing underwater life forms, capable of fluorescence, in a darkened underwater environment comprising:
   (a) a camera for photographing said underwater life forms, capable of fluorescence, in said darkened underwater environment; and
   (b) illumination fluorescent bulb means associated with said camera for exposing said underwater life forms capable of fluorescence in said darkened underwater environment to illuminating light having a spectrum with a substantial component of ultraviolet light along with light having components of wavelength extending substantially throughout the visible spectrum.

6. Apparatus of claim 5 wherein said camera contains high speed film.

7. Apparatus of claim 6 wherein said high speed film has a speed of ASA 800–1600.

8. Apparatus of claim 6 wherein said fluorescent bulb illumination means includes at least one ultra-violet-white fluorescent light bulb emitting substantial light having a wavelength of 365 nanometers.

9. Apparatus of claim 6 wherein said fluorescent bulb illumination means includes two eighteen inch ultra-violet-white fluorescent light bulbs.

10. Apparatus of claim 5 wherein said fluorescent bulb illumination means includes at least one ultra-violet-white fluorescent light bulb emitting substantial light having a wavelength of 365 nanometers.

11. Apparatus of claim 5 wherein said fluorescent bulb illumination means includes two eighteen inch ultra-violet-white fluorescent light bulbs.

12. Apparatus of claim 5 including a transparent tubular enclosure containing said fluorescent bulb illumination means.

13. A method of photographing underwater life forms, capable of fluorescence in a darkened underwater environment, comprising the steps of (a) exposing said underwater life forms, capable of fluoresce, in said darkened underwater environment to illuminating light having a spectrum with a substantial component of ultraviolet light along with white light having components of wavelength within the visible spectrum, for producing improved photographs of said underwater life forms in said darkened underwater environment, and concurrently;

(b) photographing said life forms in said darkened underwater environment.

14. The method of claim 13 wherein step (b) employs high speed film.

15. The method of claim 14 wherein said underwater life forms are exposed in accordance with step (a) continuously, enabling motion pictures to be made of said life forms.

16. The method of claim 15 wherein illumination produced by exposure step (a) is emitted by ultra-violet-white fluorescent light bulbs.

17. The method of claim 14 wherein illumination produced by exposure step (a) is emitted by ultra-violet-white fluorescent light bulbs.

18. The method of claim 13 wherein said underwater life forms are exposed in accordance with step (a) continuously, enabling motion pictures to be made of said life forms.

19. The method of claim 18 wherein illumination produced by exposure step (a) is emitted by ultra-violet-white fluorescent light bulbs.

20. The method of claim 13 wherein illumination produced by exposure step (a) is emitted by ultra-violet-white fluorescent light bulbs.

* * * * *